US012755415B2

(12) United States Patent
Martello et al.

(10) Patent No.: US 12,755,415 B2
(45) Date of Patent: Oct. 6, 2026

(54) METHOD FOR PREDICTING BODY MASS OF HERD ANIMAL, COMPUTER-READABLE STORAGE MEDIA, SYSTEM FOR PREDICTING BODY MASS OF HERD

(71) Applicants: L. THIELO DE LA VEGA LTDA, Barueri (BR); UNIVERSIDADE DE SAO PAULO—USP, Sao Paulo (BR)

(72) Inventors: Luciane Silva Martello, Pirassununga (BR); Leonardo Thielo De La Vega, Rio de Janeiro (BR); Gustavo Cynowiec Dos Anjos, Porto Alegre (BR); Rafael Vieira De Sousa, Pirassununga (BR)

(73) Assignees: L. THIELO DE LA VEGA LTDA, Barueri (BR); UNIVERSIDADE DE SAO PAULO—USP, Sao Paulo (BR)

( * ) Notice: Subject to any disclaimer, the term of this patent is extended or adjusted under 35 U.S.C. 154(b) by 237 days.

(21) Appl. No.: 18/703,110

(22) PCT Filed: Mar. 1, 2024

(86) PCT No.: PCT/BR2024/050077
§ 371 (c)(1),
(2) Date: Apr. 19, 2024

(87) PCT Pub. No.: WO2025/010481
PCT Pub. Date: Jan. 16, 2025

(65) Prior Publication Data

US 2025/0225671 A1 Jul. 10, 2025

(30) Foreign Application Priority Data

Jul. 13, 2023 (BR) .......................... 1020230140521

(51) Int. Cl.
*G06T 7/62* (2017.01)
*G06V 10/26* (2022.01)
(Continued)

(52) U.S. Cl.
CPC .............. *G06T 7/62* (2017.01); *G06V 10/273* (2022.01); *G06V 10/70* (2022.01); *G06V 40/10* (2022.01);
(Continued)

(58) Field of Classification Search
CPC . G06T 2207/10016; G06T 2207/10024; G06T 2207/10028; G06T 2207/20081;
(Continued)

(56) References Cited

U.S. PATENT DOCUMENTS 10,952,410 B2 3/2021 Dumm et al.
2014/0140582 A1 * 5/2014 Spicola, Jr. .......... A01K 1/0613 382/110
(Continued)

FOREIGN PATENT DOCUMENTS

BR 102019004750 A2 * 10/2020 ............ A22B 5/007
CN 111150402 A 5/2020
(Continued)

OTHER PUBLICATIONS

Translation of BR102019004750 (Year: 2020).*
International Search Report for Corresponding International Application No. PCT/BR2024/050077, 3 pages, Jul. 2, 2024.

*Primary Examiner* — Sean T Motsinger
(74) *Attorney, Agent, or Firm* — LUCAS & MERCANTI, LLP

(57) ABSTRACT

A method for predicting body mass of herd animal that comprises the steps of: collecting data from the livestock environment; detect and select the animal; determining geometric characteristics of each RGB-D depth image; and
(Continued)

obtaining the prediction of herd animal body mass. Furthermore, the present invention relates to a system for predicting body mass of herd, comprising: at least one RGB-D capture set including at least one RGB-D imaging sensor; at least one storage module; and at least one remote monitoring module; wherein the storage module stores a set of instructions that, when executed by a processor, carries out the method for predicting body mass of herd animal.

13 Claims, 3 Drawing Sheets

(51) Int. Cl.
*G06V 10/70* (2022.01)
*G06V 40/10* (2022.01)

(52) U.S. Cl.
CPC ............... *G06T 2207/10016* (2013.01); *G06T 2207/10024* (2013.01); *G06T 2207/10028* (2013.01); *G06T 2207/20081* (2013.01)

(58) Field of Classification Search
CPC ........ G06T 7/00–97; G06V 40/00–103; G06V 10/273; G01G 17/08
See application file for complete search history.

(56) References Cited

U.S. PATENT DOCUMENTS

| | | | | |
|---|---|---|---|---|
| 2019/0311471 | A1* | 10/2019 | Kurabayashi | G06T 7/0002 |
| 2020/0225076 | A1* | 7/2020 | Fournier | G06T 7/62 |
| 2021/0037785 | A1 | 2/2021 | Yabe | |
| 2021/0045361 | A1* | 2/2021 | Dumm | A01K 29/00 |
| 2021/0233235 | A1* | 7/2021 | Roy | A01K 61/95 |
| 2023/0276773 | A1* | 9/2023 | Benjamin | G06V 40/10<br>340/573.3 |
| 2023/0301279 | A1* | 9/2023 | Baek | G01G 3/12 |

FOREIGN PATENT DOCUMENTS

| | | | |
|---|---|---|---|
| EP | 4153042 | A1 | 3/2023 |
| KR | 102180077 | B1 | 11/2020 |
| WO | WO2021019457 | A2 | 2/2021 |

* cited by examiner

METHOD FOR PREDICTING BODY MASS OF HERD ANIMAL, COMPUTER-READABLE STORAGE MEDIA, SYSTEM FOR PREDICTING BODY MASS OF HERD

CROSS REFERENCE TO RELATED APPLICATIONS

This application is a 371 of PCT/BR2024/050077 filed on Mar. 1, 2024, which claims the benefit of priority of Brazilian Patent Application No. 1020230140521 filed on Jul. 13, 2023, both applications are incorporated herein by reference.

FIELD OF INVENTION

The present invention pertains to the technological field of computer vision. More specifically, the present invention relates to a method and a system for predicting body mass of herd animal through depth imaging and artificial intelligence tools.

BACKGROUNDS OF THE INVENTION

Currently, the body condition of animals has been used as an indicator of performance and health in animal production systems. Specifically, measuring animal body mass is necessary for handling activities with significant economic impact.

In this sense, real-time knowledge of the daily variation in animal body mass can allow the producer to optimize the space provided for the animal, improve nutritional handling practices, predict and control body mass for slaughter and, potentially serve as an indicator to monitor disease outbreaks.

However, the typical practices for determining the body condition of animals are the assessment of the animals' conditions by visual inspection or weighing with scales. These types of practices are laborious and often invasive and stressful for the animals, as they require the separation and individual containment of each animal in the herd, which also makes the process unfeasible for large herds. Due to such difficulties, in the case of meat animals, weighing is normally carried out at the initial stage of fattening and at the end, during transportation to slaughter.

Therefore, the development of technology that allows the measurement of body mass in a herd in a non-invasive way can facilitate adequate herd handling, contributing significantly to decision making, resulting in increased productivity and efficient use of the resources involved in the livestock production system.

Some solutions that explore the use of computer vision (capture and automatic processing of images) have limitations regarding their application in typical commercial environments due to their adverse conditions of some physical parameters such as, for example, luminosity, temperature, humidity and suspended particulate matter.

Medium or large-scale breeding sites are normally poorly structured and semi-open environments, which accentuate adverse conditions and make measurement precision unfeasible, leading to high degrees of uncertainty with the application of existing equipment. Therefore, the current technologies are restricted to application in stalls with a small number of animals confined in closed environments with environmental control of the physical parameters of lighting, temperature, humidity, suspended particulate matter, among others.

In particular, data processing for indirect measurement of an animal's body mass uses mathematical models built with multivariable regression methods, describing the relations between the variables involved, that is, the inputs and outputs of the model.

Due to the complex interactions between animals and the environment, associated with the adversities of the typical breeding environments described, the mathematical modeling involves a large number of variables that result in very complex and very little flexible mathematical models to deal with the uncertainties present. With regard to these complex problems, the more conventional methods have not been able to produce economical, analytical or complete solutions.

In other fields, the application of computer vision has been explored through new approaches using data mining techniques based on artificial intelligence in the construction of computer models. For example, there are commercial systems for indirectly measuring the body mass of animals applicable to the handling of medium and large herds, but they have limitations and application challenges in open and poorly structured environments.

STATE OF THE ART

In this context, in the state of the art, some solutions have been developed, aiming at measuring the body mass of animals, as discussed below.

Document KR102180077B1 discloses a system and method for estimating cattle weight based on three-dimensional images of the animal's side view, using a 3D sensor that generates a cloud of points or 3D depth image without association with a colorized digital image or grayscale. The proposed invention associates a colorized digital image of the animal's dorsal region with a 3D image, allowing the use of color-based filters that collaborate with the processing of the RGB and depth (D) (RGB-D) image to eliminate noise and select the animal in the scene, providing more robustness to the process of extracting features from images.

Furthermore, document WO2021/019457 describes a method and device for obtaining an estimate of the weight of chickens through three-dimensional images of the same by using a 3D sensor that generates a cloud of points or 3D image, in general, approximating the birds' body by solid geometric and extracting only the variables associated with this solid. However, this document does not associate a colorized digital image of the animal's dorsal region with a 3D image and does not use artificial intelligence tools.

BRIEF DESCRIPTION OF THE INVENTION

The present invention refers to a method for predicting the body mass of a herd animal, comprising the steps of:

- collecting data from the livestock environment, including:
- capturing and storing videos of the livestock environment,
  - wherein the videos are RGB-D videos of the top view of the animal;
- weighing the animal individually;
- detecting and selecting the animal, including:
- extracting RGB-D depth images from stored video;
  - wherein each RGB-D depth image extracted from the video consists of points that are represented by Cartesian coordinates, and
  - wherein the points of the RGB-D depth image are associated with the colors of the RGB standard; and
- forming a color map for each RGB-D depth image;

identifying and separating the animal from other elements included in the RGB-D depth image extracted from the video;

determining geometric characteristics of each RGB-D depth image including the top view of the animal;

wherein geometric characteristics include distance between points, area and volume;

obtaining the prediction of body mass of herd.

Furthermore, the present invention refers to a computer-readable storage medium, comprising a set of instructions that, when executed by a processor, carries out the method for predicting livestock body mass.

Furthermore, the present invention refers to a system for predicting body mass of herd, comprising: at least one RGB-D capture set including at least one RGB-D imaging sensor; at least one storage module; and at least one remote monitoring module; wherein the storage module stores a set of instructions that, when executed by a processor, carries out the method for predicting livestock body mass.

BRIEF DESCRIPTION OF THE FIGURES

In order to complement the present description and obtain a better understanding of the features of the present invention, and in accordance with a preferred embodiment thereof, in annex, a set of figures is presented, where in an exemplified, although not limiting, manner, the preferred embodiment is represented.

DETAILED DESCRIPTION OF THE INVENTION

Figure 1:
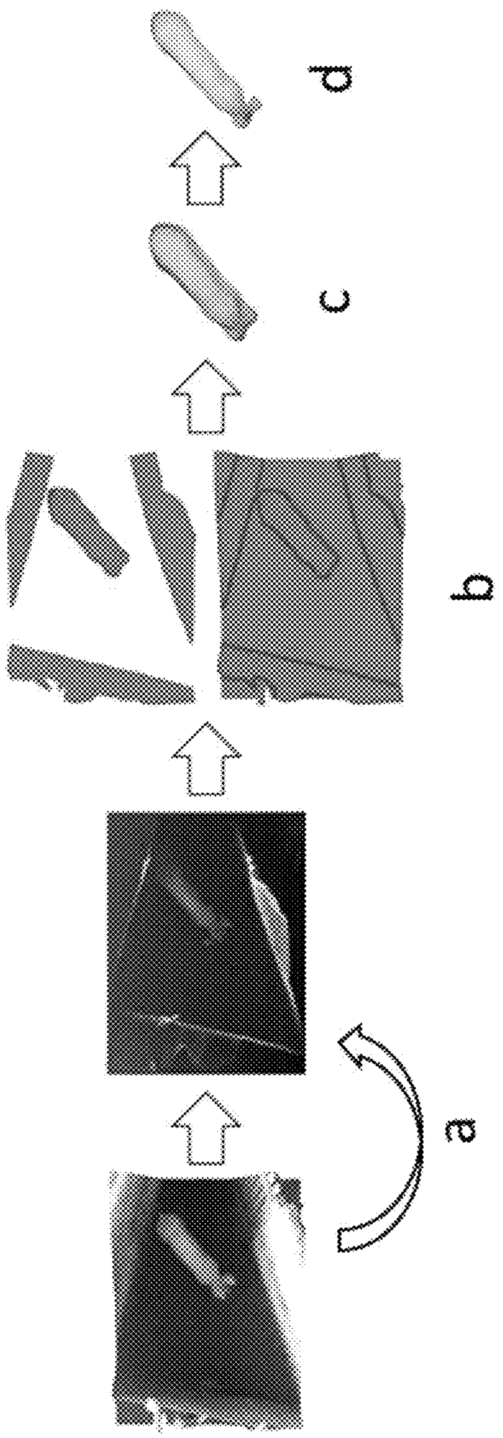
FIG. 1 shows the filtering process included in the step of detecting and selecting the animal.

According to a preferred embodiment of the present invention, the method for predicting body mass of herd animal comprises the steps of: collecting data from the livestock environment; detecting and selecting the animal; determining geometric characteristics of each RGB-D depth image; and obtaining the prediction of body mass of herd animal.

The step of collecting data from the livestock environment includes capturing and storing videos of the livestock environment, which may include, but is not limited to, an individual containment chute or stall or paddock or passage area or handling area, which has an associated scale.

Specifically, the captured videos are RGB-D videos of the animal's back, that is, of the top view of the animal, wherein the capture is carried out by using an RGB-D capture set of the system for predicting body mass of herd animal.

Furthermore, the step of collecting data from the livestock environment comprises weighing the animal individually on the scale in the chute, stall or paddock or passage area or handling area and obtaining the mass M of the animal, while the system for predicting body mass of herd animal collects and stores RGB-D videos of the animal's back, which are associated with the animal's weighing data, which will be processed later to identify the animal in the scene and extract dimensions.

In particular, for each phase of growth and fattening of animals, video collection and storage and weighing of at least 30 animals must be carried out. The final accuracy for measuring body mass will directly depend on the number of animals and the quality of the data collection process.

The step of detecting and selecting the animal includes extracting RGB-D depth images from the stored video. Each RGB-D depth image extracted from the video consists of points that are represented by Cartesian coordinates (x, y, z) according to the distance between the RGB-D capture set and the objects in the RGB-D depth image (i.e., a scene). The RGB-D depth image points are also associated with colors of a certain color pattern, typically RGB (Red, Green and Blue), obtained from the depth image color by the RGB-D capture set. Furthermore, the step of detecting and selecting the animal further includes forming a color map for each RGB-D depth image, wherein the points in the RGB-D depth image are associated with colors, as previously stated. Each RGB-D depth image associated with the color map forms a file called RGB-D image comprising the colorized digital image and a cloud of points.

Specifically, the RGB-D depth image includes the animal and other elements of the scene, and such elements must be separated from the scene, so that only the top view of the animal's body remains, that is, the back of the animal.

In this sense, the step of detecting and selecting the animal further includes identifying and separating the animal from other elements included in the RGB-D depth image extracted from the video (scene), including the application of a filtering process, which uses an image of the empty chute or stall or paddock or passage area or handling area and the animal's color histogram to compose filtering masks.

Specifically, according to FIG. 1, the filtering process comprised in the step of detecting and selecting the animal comprises at least the following steps:

application of a statistical filter to remove outliers;

global alignment by using the RANSAC (Random Sample Consensus) method or similar between the images of the empty chute or stall or paddock or passage area or handling area and the image with the animal;

local filtering by using the ICP (Iterative Closest Point) method or similar for more precise alignment between the image of the empty chute or stall or paddock or passage area or handling area and the image with the animal, as shown in item a in FIG. 1;

animal selection filtering in the scene by using masks to subtract points from the image that do not belong to the animal, and cutting points with height and dimensions outside a range corresponding to the animal's dimensions, as shown in item b of FIG. 1;

removal of points whose color, statistically, apparently does not belong to the animal by using the Otsu method (as in Otsu, N. (1975) *A Threshold Selection Method from Gray-Level Histograms*. Automatica, 11, 23-27; and as in Liao, P. S., Chen, T. S., & Chung, P-C. (2001). *A fast algorithm for multilevel thresholding*. Journal of Information Science and Engineering, 17 (5), 713-727), or similar, as shown in item c of FIG. 1; and application of a statistical filter to remove outliers to obtain the final image, as shown in item d in FIG. 1.

Figure 2:
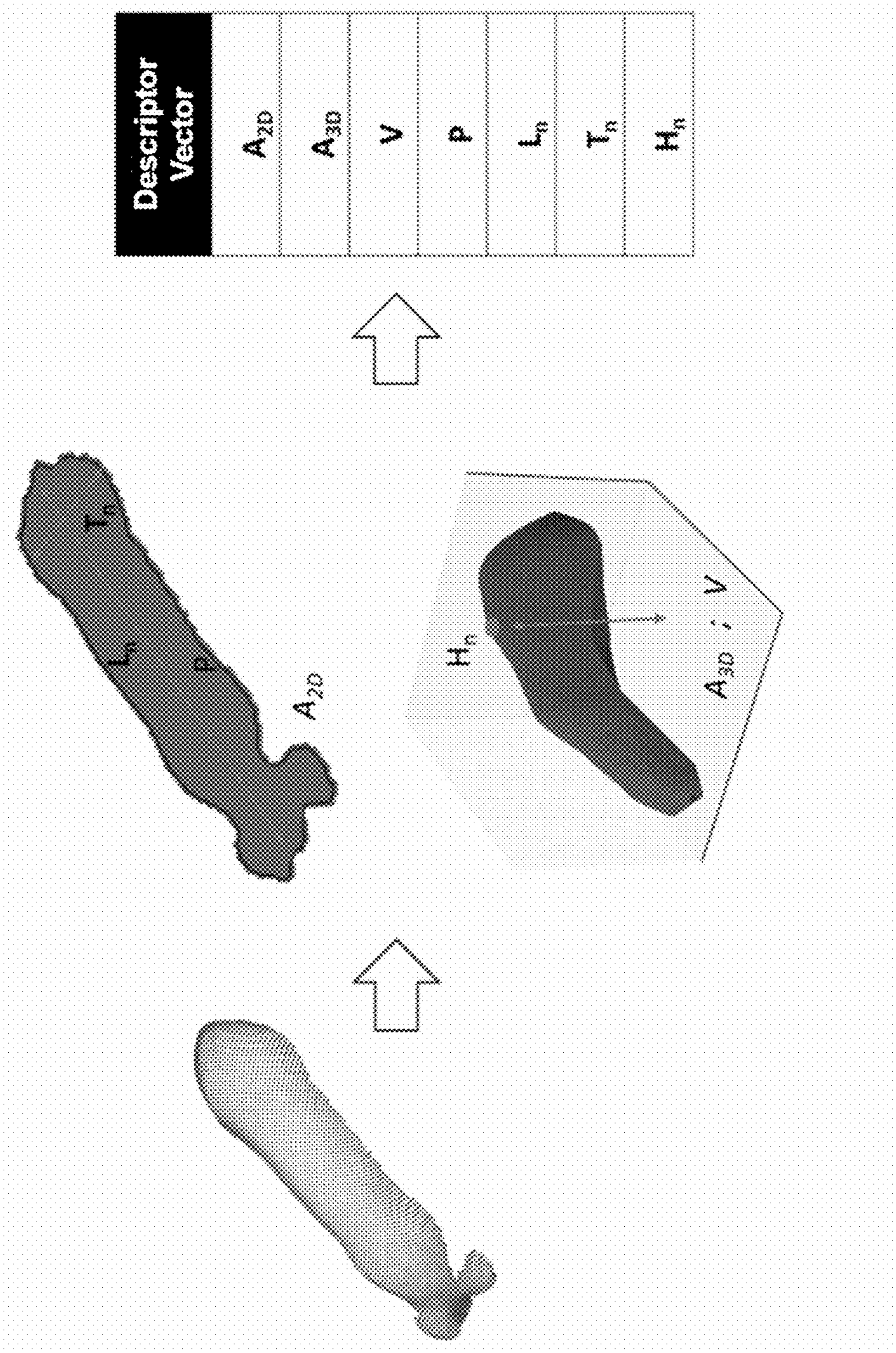
FIG. 2 illustrates the determination of geometric characteristics of the RGB-D depth image with the top view of the animal.

The step of determining geometric characteristics of each RGB-D depth image, wherein the RGB-D depth image includes only the top view (back view) of the animal, and wherein the geometric characteristics are called predictive attributes (descriptor vector), is illustrated in FIG. 2.

Specifically, the geometric characteristics include distance between points, area and volume.

The distance between points can be any of, but not restricted to: the greatest or the average of the 'n' greatest longitudinal distances from the top view of the animal ($L_n$); the greatest or average of the 'n' greatest transverse distances from the top view of the animal ($T_n$); and the greatest or average of the 'n' greatest vertical distances ($H_n$) between the top view of the animal and the ground, wherein the ground is represented by points of zero height, assigned by the filtering processes.

In addition, as illustrated in FIG. 2, the step of determining geometric characteristics of each RGB-D depth image including the top view of the animal further includes applying a triangulation method (e.g., Delaunay) and a contour identification method (e.g., Convex Hull or Alpha-Shape) to RGB-D depth image including the top view of the animal; and obtaining the area of the three-dimensional surface (A3D), the area of the two-dimensional projection on the plane of the top view of the animal (A2D), its perimeter (P) and volume of the three-dimensional surface (V), wherein the latter are obtained through the values of area and height. When using some deep supervised learning methods of cloud of points, the convolution layers perform the extraction of geometric characteristics and, therefore, replace the triangulation method and the contour identification method.

The step of obtaining the prediction of body mass of herd animal comprises performing computer modeling using machine learning techniques to build an algorithm to obtain the prediction of body mass of herd, based on the features extracted from the in-depth image (descriptor vector), wherein such an algorithm performs the steps of the method for predicting body mass of herd animal, as described above.

Specifically, the step of obtaining the prediction of body mass of herd animal comprises performing a computer modeling based on current supervised learning techniques that use labeled databases, where the input data, called predictive attributes, are associated to previously known outputs (such as previously collected examples), called meta attributes.

In addition, the supervised learning tools allow training algorithms to build computer models predicting quantitative (values) or qualitative (classifications) information from new provided input data. In this context, the tools for developing predictive models (of values or classification) are vast, containing several classes of algorithms applied to supervised learning, of which the following stand out: Artificial Neural Networks, Support Vector Machine, Random Forest, K-Nearest Neighbors (k-Nearest Neighbors, KNN, as in Izbicki, R. and Santos, T. M. dos. *Aprendizado de máquina: uma abordagem estatística.* 1$^{st}$ edition. 2020. 272 pages. ISBN: 978-65-00-02410-4.) and Deep Learning of Cloud of Points (e.g., PointNet, as in Qi, C., Hao Su, Kaichun Mo and Leonidas J. Guibas. "*PointNet: Deep Learning on Point Sets for 3D Classification and Segmentation.*" 2017 IEEE Conference on Computer Vision and Pattern Recognition (CVPR) (2016): 77-85.). This last class of algorithms has convolution layers that are responsible for extracting geometric characteristics before the layer for predicting body mass. In the case of applying Deep Learning of Cloud of Points, the convolution layers replace the triangulation method (e.g., Delaunay) and the contour identification method (e.g., Convex Hull or Alpha-Shape).

Figure 3:
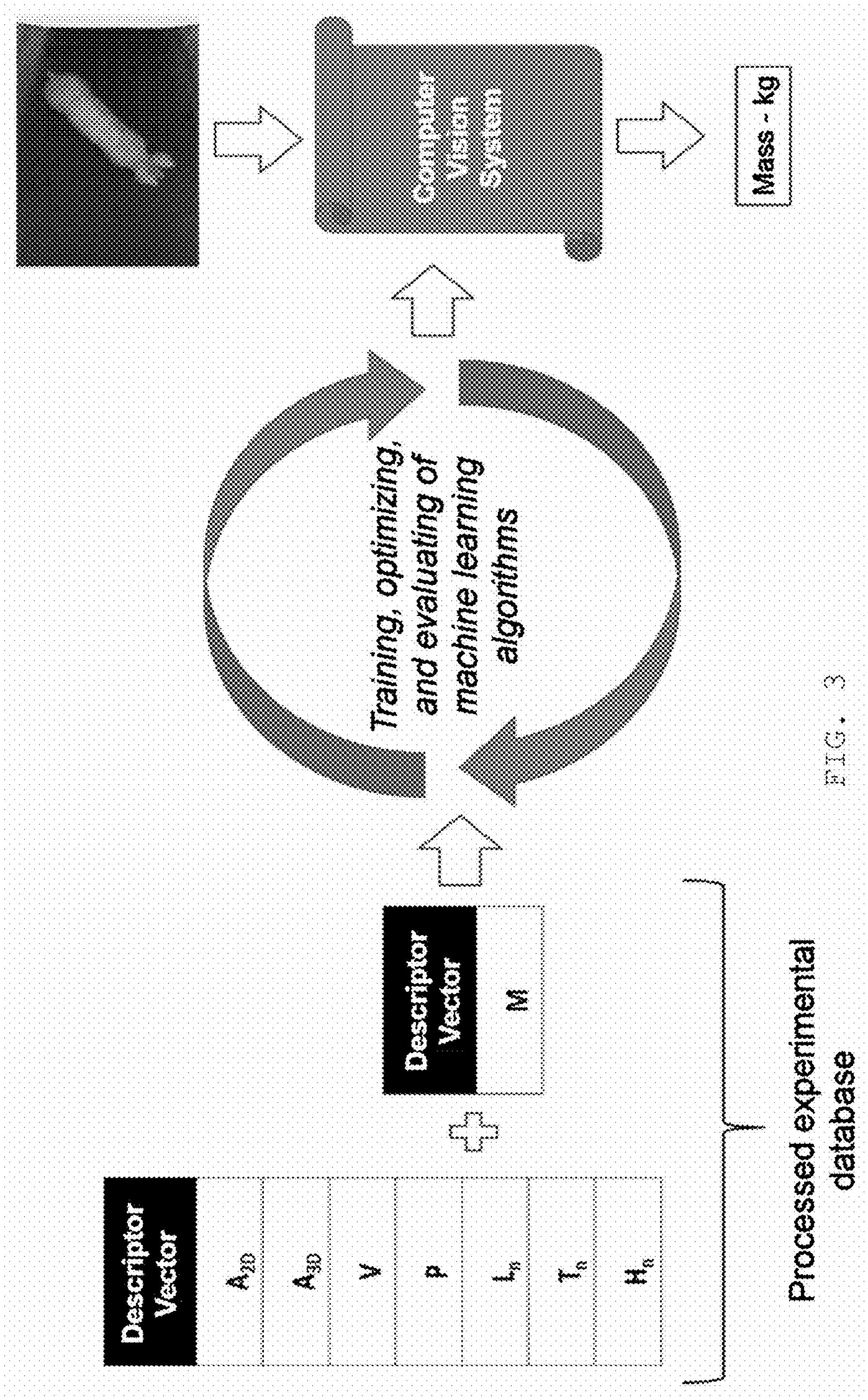
FIG. 3 illustrates a visual diagram of the method and system for predicting body mass of herd animal.

More specifically, as shown in FIG. 3, by using this set of techniques, the models are parameterized (hyperparameters), simulated and evaluated, using all combinations with different predictive attributes (descriptor vectors) to predict body mass of herd animal.

For training, optimization and comparison evaluation of the algorithms, a cross-validation protocol is applied with randomly selected data called k-fold for each model under construction.

The k-fold protocol is widely used in predictive modeling, seeking to evaluate how accurate each model is, that is, its performance for a new set of predictive attributes and hyperparameters. The training processes for building algorithms based on these machine learning methods require iterations in which adjustments are made to the respective hyperparameters with the goal of converging the response that minimizes the error between the predicted value and the real value. The prediction algorithms generated by the training process for each machine learning method are compared to choose the best algorithm by using analysis metrics with linear regression parameters (correlation coefficient and residual) and error parameters (mean percentage error and mean square error), as in Izbicki, R. and Santos, T. M. dos. *Aprendizado de máquina: uma abordagem estatística.* 1$^{st}$ edition. 2020. 272 pages. ISBN: 978-65-00-02410-4.).

The result of the computer modeling step is an algorithm of prediction of body mass of herd, which carries out a method for predicting body mass of herd animal, in accordance with the present invention.

More particularly, the method of the present invention requires that all steps be carried out for each type of animal and breed so that the final calibrated algorithm can be obtained. However, the use of the method for predicting body mass of herd animal based on supervised machine learning provides great robustness to the measurement process as it provides greater immunity to the environmental variations (such as lighting conditions, temperature, humidity and suspended particulate matter).

In addition, the method for predicting body mass of herd animal based on supervised machine learning gives the algorithm greater ability to deal with uncertainties in the measurement process related to random noises from the image acquisition process and variation in pose of the animal in each image. These advantages over the traditional methods based on statistical or dynamic models are due to the known fact that the process of building supervised machine learning algorithms can compare actual responses with the expected responses to find errors and deal with uncertainties, learning and making the necessary adjustments to reach the expected ideal computer model or algorithm.

Complementarily, according to another preferred embodiment of the present invention, the computer program or algorithm or set of instructions that carries out the method for predicting body mass of herd animal can be embedded in the system for predicting body mass of herd, through any computer-readable storage medium or media, which is capable of storing the computer program or algorithm or set of computer-readable instructions that, when executed by a processor, carries out the method for prediction of body mass of herd animal.

Complementarily, according to an additional preferred embodiment, the present invention refers to a system for predicting body mass of herd, which comprises at least one RGB-D capture set, at least one storage module and at least a remote monitoring module.

Especially, the system for predicting body mass of herd can also be noted as a computer vision system for predicting body mass of herd.

Specifically, the RGB-D capture set performs the collection of data from the livestock environment, that is, the capture of RGB-D videos, and may include at least one RGB-D imaging sensor, wherein the RGB-D imaging sensor can be included in a camera.

Furthermore, the RGB-D capture set can be installed in the livestock environment, in the individual containment chute, in the stall, in the paddock or in the passage area or handling area of animals, in order to make image capture possible of the animal's back, that is, an image of the top view of the animal.

More specifically, the RGB-D capture set can be installed in the upper part of the livestock environment, at a height compatible with the minimum and maximum capture distance specifications of this set, which can vary between 2 and 5 meters, for example.

Complementarily, the storage module stores a computer program or an algorithm or a set of instructions that, when executed by a processor, carries out the method for predicting the body mass of the herd animal. More particularly, the storage module comprises at least:

- a computer program or algorithm or set of instructions for prediction;
- a computer program or algorithm or set of instructions for controlling video-image capture used in the first step of the method, the step of collecting data from the livestock environment;
- a computer program or algorithm or set of instructions for detecting and selecting the animal in each image applied in the second step of the method, the step of detecting and selecting the animal;
- a computer program or algorithm or set of instructions for extracting geometric characteristics applied in the third step of the method, the step of determining geometric characteristics of each RGB-D depth image; and
- a computer program or algorithm or set of instructions for configuring and calibrating the system for predicting body mass of herd.

In particular, the computer program or algorithm or set of instructions for configuring and calibrating the system for predicting body mass of herd allows the RGB-D image capture without the presence of animals in the individual containment chute, in the stall, in the paddock or in the passage area or handling area, where the system for predicting body mass of herd is installed, enabling the use of filtering masks related to the step of detecting and selecting the animal.

In addition, the computer program or algorithm or set of instructions for configuring and calibrating the system for predicting body mass of herd performs the insertion of the data collection and communication rate, of the installation height and capture limits that define a coverage area in the horizontal plane to the ground and areas to be excluded from the image processing.

Furthermore, the configuration and calibration process allows the mass prediction computer model to be independent of the model or manufacturer of the RGB-D imaging sensor. The parameters of minimum and maximum distances, angles of the vertical and horizontal field of view, acquisition rate, which are characteristic parameters for each camera that comprises the RGB-D imaging sensor of the RGB-D capture set, impact the height of its fixation as well as the capture area and quantity of collections per period.

In this way, each camera in the RGB-D capture set that collects RGB-D images must respect the limits imposed by its characteristics for its fixation.

After fixing the RGB-D capture set, obeying these limits, the images are captured by using the computer program or algorithm or set of instructions for configuration and calibration of the system for predicting body mass of herd, which allows viewing the coverage area, inserting marking of exclusion zones, collecting image of the environment without animals (filter mask) and marking its height from the ground. The capture rate can be adjusted between 5 and 10 images per second (fps—frames per second), for example, complying with the minimum limits for each manufacturer.

The computer vision system for predicting body mass of herd may include two modes of operation, namely: the configuration and calibration mode, and the collection and prediction mode.

In configuration and calibration mode, the user has access to the configuration and calibration algorithm with all the functionalities related to the installation and initialization of the equipment at the operating location (chute, stall, paddock or passage area or handling area), as already described.

In collection and prediction mode, in turn, the computer vision system for predicting body mass of herd goes into cyclical and automatic mode by repeatedly executing the following algorithms in sequence: controlling video-image capture; detecting and selecting the animal in each image; extracting geometric characteristics; and predicting body mass. At the end of each cycle, before repeating the sequence, the body mass data is stored or transmitted via a standard wired or wireless communication interface selected on an embedded processor.

According to a preferred embodiment of the present invention, it is possible to install one or more systems for predicting body mass of herd in an animal production environment, such as in chutes, stalls, paddocks, passage areas or handling areas.

Furthermore, according to an additional preferred embodiment of the present invention, the remote monitoring module receives the data collected by the system to predicting body mass of herd, calculating the average body mass and mass gain of the animals per stall or paddock during a set period, for example daily or weekly.

The system for predicting body mass of herd can also be installed in a passage or handling area to measure the individual mass of an animal identified manually or by using label or electronic tag technology. The manual or electronic identification data can be sent to a remote monitoring system, at the same time as the mass measurement is communicated. In this case, the user can monitor the individual mass gain for each animal.

Those skilled in the art will value the knowledge presented herein and will be able to reproduce the invention in the presented embodiments and in other variants, encompassed by the scope of the attached claims.

The invention claimed is:

1. A method for predicting body mass of herd animal, comprising the steps of:

collecting data from the livestock environment, including:

capturing and storing videos of the livestock environment, wherein the videos are RGB-D videos of the top view of the animal;

weighing the animal individually;

detecting and selecting the animal, including:

extracting RGB-D depth images from stored video;

wherein each RGB-D depth image extracted from the video consists of points that are represented by Cartesian coordinates, and wherein the points of the RGB-D depth image are associated with the colors of the RGB standard; and forming a color map for each RGB-D depth image;

identifying and separating the animal from other elements included in the RGB-D depth image extracted from the video;

determining geometric characteristics of each RGB-D depth image including the top view of the animal;

wherein geometric characteristics include distance between points, area and volume;

wherein the distance between points includes any of:

the greatest or the average of the 'n' greatest longitudinal distances from the top view of the animal ($L_n$); the greatest or average of the 'n' greatest transverse distances from the top view of the animal ($T_n$); and the greatest or average of the 'n' greatest vertical distances ($H_n$) between the top view of the animal and the ground; wherein the ground is represented by points of zero height; and obtaining the prediction of body mass of herd.

2. The method according to claim 1, wherein the livestock environment includes any of an individual containment chute, a stall, a paddock, a passage area or a handling area.

3. The method according to claim 1, wherein the captured videos are RGB-D videos of the animal's back.

4. The method according to claim 1, wherein each RGB-D depth image associated with the color map forms a file comprising the colorized digital image and a cloud of points.

5. The method according to claim 1, wherein the step of identifying and separating the animal from other elements included in the RGB-D depth image extracted from the video further comprises:

application of a statistical filter to remove outliers;

global alignment by using the RANSAC method (Random Sample Consensus) between the images of the livestock environment and the image with the animal;

local filtering by using the ICP (Iterative Closest Point) method for alignment;

use of masks to subtract points from the image that do not belong to the animal, and cutting points with height and dimensions outside a range corresponding to the animal's dimensions; and removal of points whose color does not belong to the animal by using the Otsu method.

6. The method according to claim 1, wherein the step of obtaining the prediction of body mass of herd comprises performing computer modeling using machine learning techniques.

7. A non-transitory computer readable medium, comprising a set of instructions that, when executed by a processor, causes the processor to perform operations comprising:

collecting data from the livestock environment, including:

capturing and storing videos of the livestock environment, wherein the videos are RGB-D videos of the top view of the animal;

weighing the animal individually;

detecting and selecting the animal, including:

extracting RGB-D depth images from stored video;

wherein each RGB-D depth image extracted from the video consists of points that are represented by Cartesian coordinates, and wherein the points of the RGB-D depth image are associated with the colors of the RGB standard; and forming a color map for each RGB-D depth image;

identifying and separating the animal from other elements included in the RGB-D depth image extracted from the video;

determining geometric characteristics of each RGB-D depth image including the top view of the animal;

wherein geometric characteristics include distance between points, area and volume;

wherein the distance between points includes any of: the greatest or the average of the 'n' greatest longitudinal distances from the top view of the animal ($L_n$); the greatest or average of the 'n' greatest transverse distances from the top view of the animal ($T_n$); and the greatest or average of the 'n' greatest vertical distances ($H_n$) between the top view of the animal and the ground; wherein the ground is represented by points of zero height; and obtaining the prediction of body mass of herd.

8. A system for predicting body mass of herd, comprising:

at least one RGB-D capture set, including at least one RGB-D imaging sensor;

at least one storage module; and at least one remote monitoring module;

wherein the storage module stores a set of instructions that, when executed by a processor, carries out the method for predicting body mass of herd animal as defined in claim 1.

9. The system according to claim 8, wherein the at least one RGB-D capture set is installed in the livestock environment.

10. The system according to claim 8, wherein the livestock environment includes any of an individual containment chute, a stall, a paddock, a passage area or a handling area.

11. The system according to claim 8, wherein the at least one RGB-D capture set is installed in the upper part of the livestock environment.

12. A method for predicting body mass of herd animal, comprising the steps of:

collecting data from the livestock environment, including:

capturing and storing videos of the livestock environment, wherein the videos are RGB-D videos of the top view of the animal;

weighing the animal individually;

detecting and selecting the animal, including:

extracting RGB-D depth images from stored video;

wherein each RGB-D depth image extracted from the video consists of points that are represented by Cartesian coordinates, and wherein the points of the RGB-D depth image are associated with the colors of the RGB standard; and forming a color map for each RGB-D depth image;

identifying and separating the animal from other elements included in the RGB-D depth image extracted from the video;

determining geometric characteristics of each RGB-D depth image including the top view of the animal;

wherein geometric characteristics include distance between points, area and volume;

wherein the step of determining geometric characteristics of each RGB-D depth image including the top view of the animal further comprises applying a triangulation method and a contour identification method to the RGB-D depth image including the top view of the animal; and obtaining the area of the three-dimensional surface (A3D), the area of the two-dimensional projection on the plane of the top view of the animal (A2D), its perimeter (P) and volume of the three-dimensional surface (V); and obtaining the prediction of body mass of herd.

13. A method for predicting body mass of herd animal according to claim 12, wherein the triangulation method is the Delaunay method and the contour identification method is Convex Hull or Alpha-Shape.

* * * * *